United States Patent
Erikson

(10) Patent No.: US 10,179,635 B2
(45) Date of Patent: Jan. 15, 2019

(54) UNDERWATER POSITIONING SYSTEM FOR SCUBA DIVERS

(71) Applicant: Ekaterina Erikson, Longwood, FL (US)

(72) Inventor: Ekaterina Erikson, Longwood, FL (US)

(73) Assignee: U.S. Trading Partners, Inc., Longwood, FL (US)

( * ) Notice: Subject to any disclaimer, the term of this patent is extended or adjusted under 35 U.S.C. 154(b) by 4 days.

(21) Appl. No.: 15/201,763

(22) Filed: Jul. 5, 2016

(65) Prior Publication Data

US 2017/0144737 A1    May 25, 2017

Related U.S. Application Data

(60) Provisional application No. 62/257,782, filed on Nov. 20, 2015.

(51) Int. Cl.
*B63C 11/12*    (2006.01)
*B63C 11/02*    (2006.01)
*H04B 13/02*    (2006.01)
*H04B 11/00*    (2006.01)

(52) U.S. Cl.
CPC .............. *B63C 11/12* (2013.01); *H04B 11/00* (2013.01); *H04B 13/02* (2013.01); *B63C 2011/021* (2013.01); *B63C 2011/121* (2013.01)

(58) Field of Classification Search
CPC ... B63C 11/26; B63C 2011/121; B63C 11/12; B63C 11/48; B63C 9/0005; H04B 13/02; H04B 10/116
See application file for complete search history.

(56) References Cited

U.S. PATENT DOCUMENTS

| | | | |
|---|---|---|---|
| 5,148,412 A * | 9/1992 | Suggs | B63C 11/26 367/107 |
| 5,185,605 A | 2/1993 | Roberts, Jr. et al. | |
| 5,331,602 A * | 7/1994 | McLaren | G01S 5/0009 367/127 |
| 7,145,835 B2 | 12/2006 | Pope | |
| 7,190,636 B1 * | 3/2007 | Depaola | H04B 10/1143 367/131 |
| 7,388,512 B1 * | 6/2008 | Moorer, Jr. | B63C 11/26 340/539.1 |

(Continued)

OTHER PUBLICATIONS

International Search Report for corresponding PCT application PCT/US2016/057844, dated Aug. 14, 2017 (2 pages).

*Primary Examiner* — Muhammad N Edun
*Assistant Examiner* — Jerold Murphy
(74) *Attorney, Agent, or Firm* — Jason T. Daniel, Esq.; Daniel Law Offices, P.A.

(57) ABSTRACT

An underwater positioning system for scuba divers includes a base station having an underwater transmitter and receiver for sending and receiving underwater signals. The system also includes at least one diver unit having a scuba-style mask with a plurality of receivers for detecting the transmitted base signal. A diver display is positioned within the inside facing portion of the mask for indicating the direction of the base station. The diver unit also includes a transmitter for sending an emergency SOS signal to the base station and other diver units.

11 Claims, 6 Drawing Sheets

(56) References Cited

U.S. PATENT DOCUMENTS

| | | | |
|---|---|---|---|
| 7,642,919 B2* | 1/2010 | Leal | B63C 9/0005 |
| | | | 340/539.13 |
| 8,082,922 B2 | 12/2011 | McWilliams | |
| 2002/0176323 A1* | 11/2002 | Magine | B63C 11/26 |
| | | | 367/134 |
| 2004/0022129 A1 | 2/2004 | McGeever, Jr. | |
| 2004/0062411 A1* | 4/2004 | Retchin | H04R 1/1066 |
| | | | 381/376 |

* cited by examiner

UNDERWATER POSITIONING SYSTEM FOR SCUBA DIVERS

CROSS-REFERENCE TO RELATED APPLICATIONS

This application claims the benefit of U.S. Application Ser. No. 62/257,782 filed on Nov. 20, 2015, the contents of which are incorporated herein by reference.

TECHNICAL FIELD

The present invention relates generally to location systems and more particularly to an underwater positioning system for scuba divers.

BACKGROUND

The statements in this section merely provide background information related to the present disclosure and may not constitute prior art.

Safety is the most important aspect of any sport or activity. With particular regard to scuba diving, there are many inherent risks which must be managed to ensure a safe and pleasant experience for the participants. In this regard, one of the most important aspects of scuba diving is to ensure that all divers safely return to the Point of Entry (POE), such as a dive boat, for example.

The need for a scuba diver to be able to find and reach their POE is especially important in light of new technology such as electrically powered "tugs" which can take divers significantly further from their POE than would be otherwise possible. In situations where the diver is unable to return to their POE, the diver must perform an open water surfacing procedure. Such procedures are particularly dangerous, as the diver may not be equipped with a surface flag or other such device that notifies boat traffic of the location of the surfacing diver. As such, many accidents have occurred wherein a diver attempting to surface at a location other than their POE has been struck and killed by a passing boat.

Moreover, although scuba divers are taught to always swim in pairs, many divers routinely ignore this safety rule. As such, if a solo diver becomes lost and/or disoriented due to unexpected inclement weather, for example, and/or experiences a medical emergency, the diver currently has no way to notify others, including the dive boat, that he or she is in trouble.

Accordingly, the present invention directed to an underwater positioning system for scuba divers provides a new and innovative approach to alleviate the issues described above. The manner by which will become more apparent in the description which follows, particularly when read in conjunction with the accompanying drawings.

SUMMARY OF THE INVENTION

The present invention is directed to an underwater positioning system for scuba divers. One embodiment of the present invention can include a base station having an underwater transmitter and receiver for sending and receiving underwater signals. The invention can also include at least one diver unit which can receive the underwater signals transmitted by the base station and provide a visual indication of the direction of the same.

In one embodiment, the diver unit includes a scuba-style mask having a plurality of receivers for detecting the transmitted base signal from any direction, and a diver display that is positioned within the inside facing portion of the mask. The diver display can include a plurality of lighted elements which can be selectively illuminated to indicate the direction of the base station.

In yet another embodiment, the diver unit can further include an emergency transmitter that can send an emergency SOS signal to each of the base station and other diver units.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
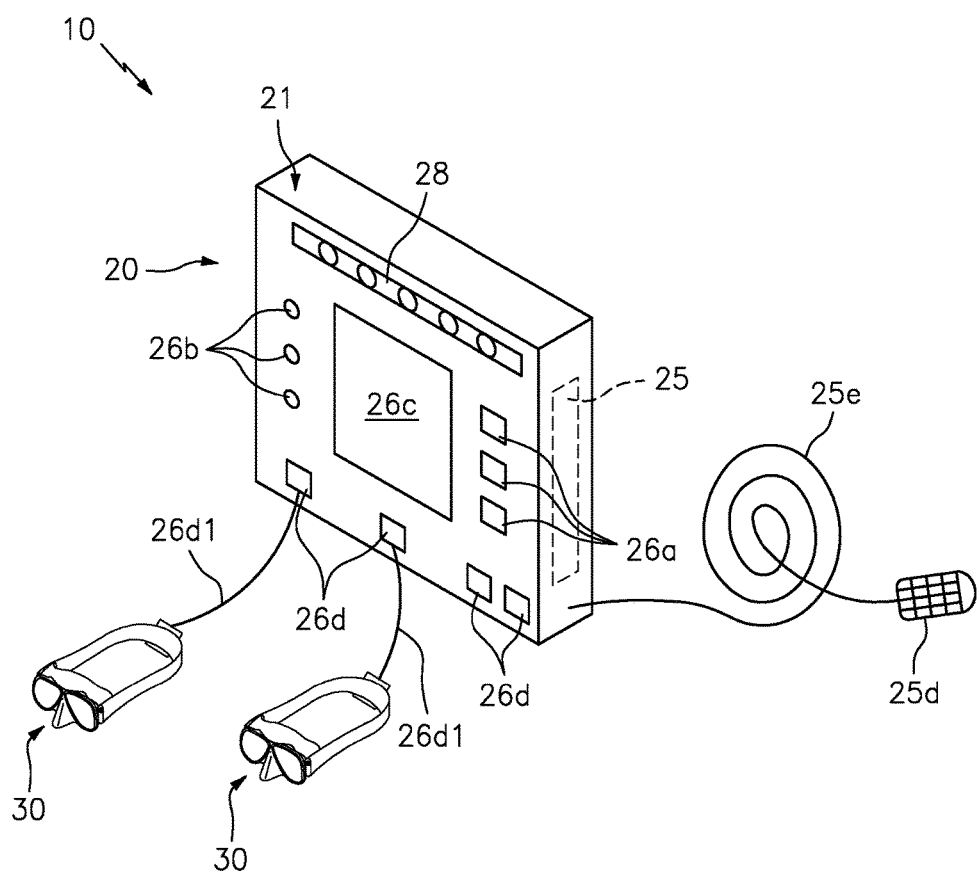
FIG. 1 is a perspective view of the underwater positioning system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Although described and illustrated with regard to an underwater system, the inventive concepts disclosed herein are not limiting to an underwater environment. As such, elements of the system can be performed in any environment wherein locating a point of entry and/or a participant in trouble is desirable. More specifically, one such variant is intended for use with firefighters, and can be integrated into firefighting equipment without undue experimentation.

FIGS. 1-5 illustrate various embodiments of an underwater positioning system for scuba divers 10 that is useful for understanding the inventive concepts disclosed herein. Throughout the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in FIG. 1, one embodiment of the underwater positioning system for scuba divers 10 can include, essentially, a base station 20 and one or more diver units 30.

Figure 2:
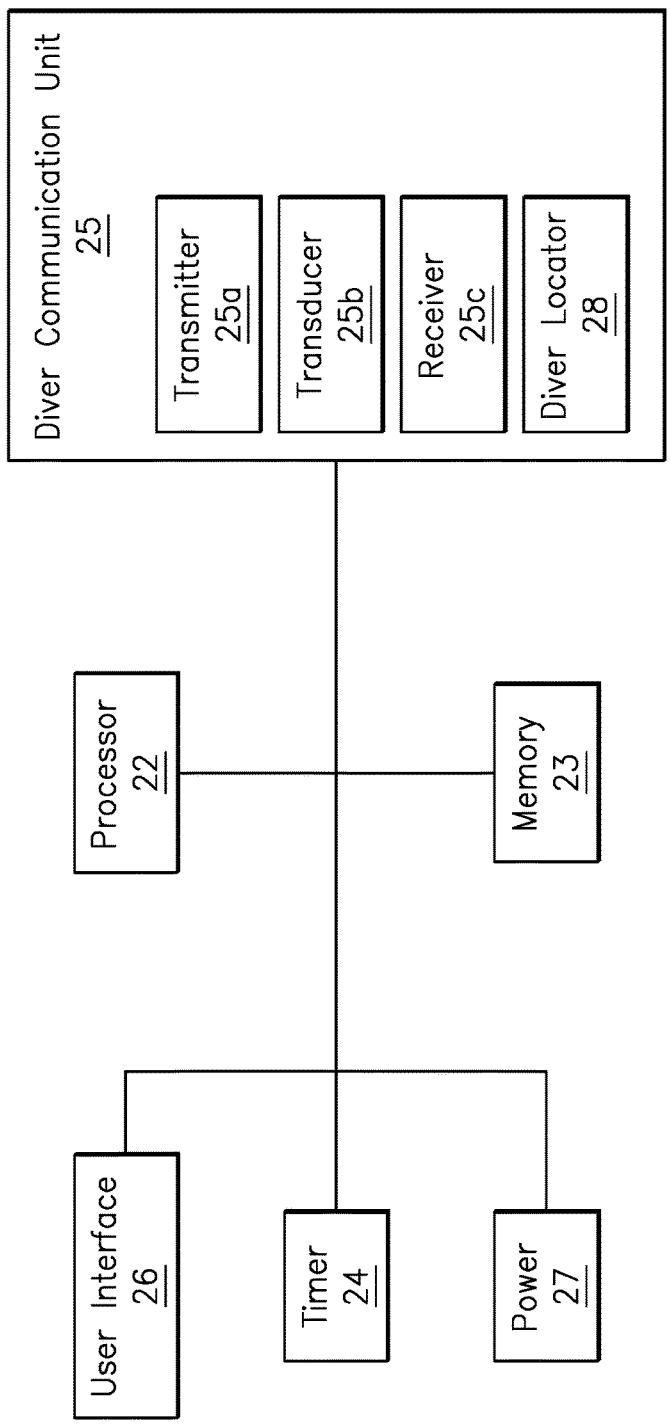
FIG. 2 is a simplified block diagram of the base station, in accordance with one embodiment of the invention.

FIG. 2 illustrates an exemplary block diagram of the base station 20 illustrated in FIG. 1. As shown, the base station can include a main body 21 having a processor 22 that is conventionally connected to an internal memory 23, a timer module 24, a diver communication unit 25, a user interface 26, and/or a power source 27.

Although illustrated as separate elements, those of skill in the art will recognize that one or more system components may comprise, or include one or more printed circuit boards (PCB) containing any number of integrated circuit or circuits for completing the activities described herein. The processor may be one or more integrated circuits having firmware for causing the circuitry to complete the activities described herein. Of course, any number of other analog and/or digital components capable of performing the below described functionality can be provided in place of, or in conjunction with the below described controller elements.

The main body 21 can house each of the elements in a conventional manner, so as to create a single device. In this regard, the main body 21 can take any number of different shapes and sizes, and can be constructed from any number of different materials and methods. In one preferred embodiment, the main body 21 can be constructed from a lightweight waterproof and corrosion-resistant material such as plastic, for example, having a plurality of internal connectors (not shown) for securely housing each of the device elements. Of course, any number of other such materials such as PVC, composites, and various metals, for example, are also contemplated.

The processor/CPU 22 can act to execute program code stored in the memory 23 in order to allow the device to perform the functionality described herein. Likewise, a timer module 24 can be provided, and can function to accurately measure the passage of time. As described herein, the timer module can be provided as a function of the processor or can include a separate physical circuit. In either instance, processors and timers are extremely well known in the art, therefore no further description will be provided.

Memory 23 can act to store operating instructions in the form of program code for the processor 22 to execute. Although illustrated in FIG. 2 as a single component, memory 23 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example. Additionally, memory 23 can also include one or more cache memories that provide temporary storage of at least some program code in order to reduce the number of times program code must be retrieved from the bulk storage device during execution. Each of these devices are well known in the art.

The diver communication unit 25 can include any number of different components that are capable of sending and/or receiving any type of signal, in order to communicate wirelessly with an external device, such as the below described diver unit 30. In the preferred embodiment, the communication unit 25 can include a portable sonar system having one or more transmitters 25a, transducers 25b, and receivers 25c. In one embodiment, a transmitter, transducer and/or receiver can be located within a waterproof housing 25d that is connected to the main body via an elongated cable 25e so as to allow the same to be removably positioned underwater at the divers POE. In yet another embodiment, a plurality of such waterproof housings can be deployed as an array so as to allow a user of the base station to locate a diver unit transmitting a distress signal, as described below with regard to FIG. 5. One exemplary embodiment of a portable sonar unit which may be used in conjunction with the communication unit is described in U.S. Pat. No. 7,145,835, the contents of which are incorporated herein by reference.

Figure 5:
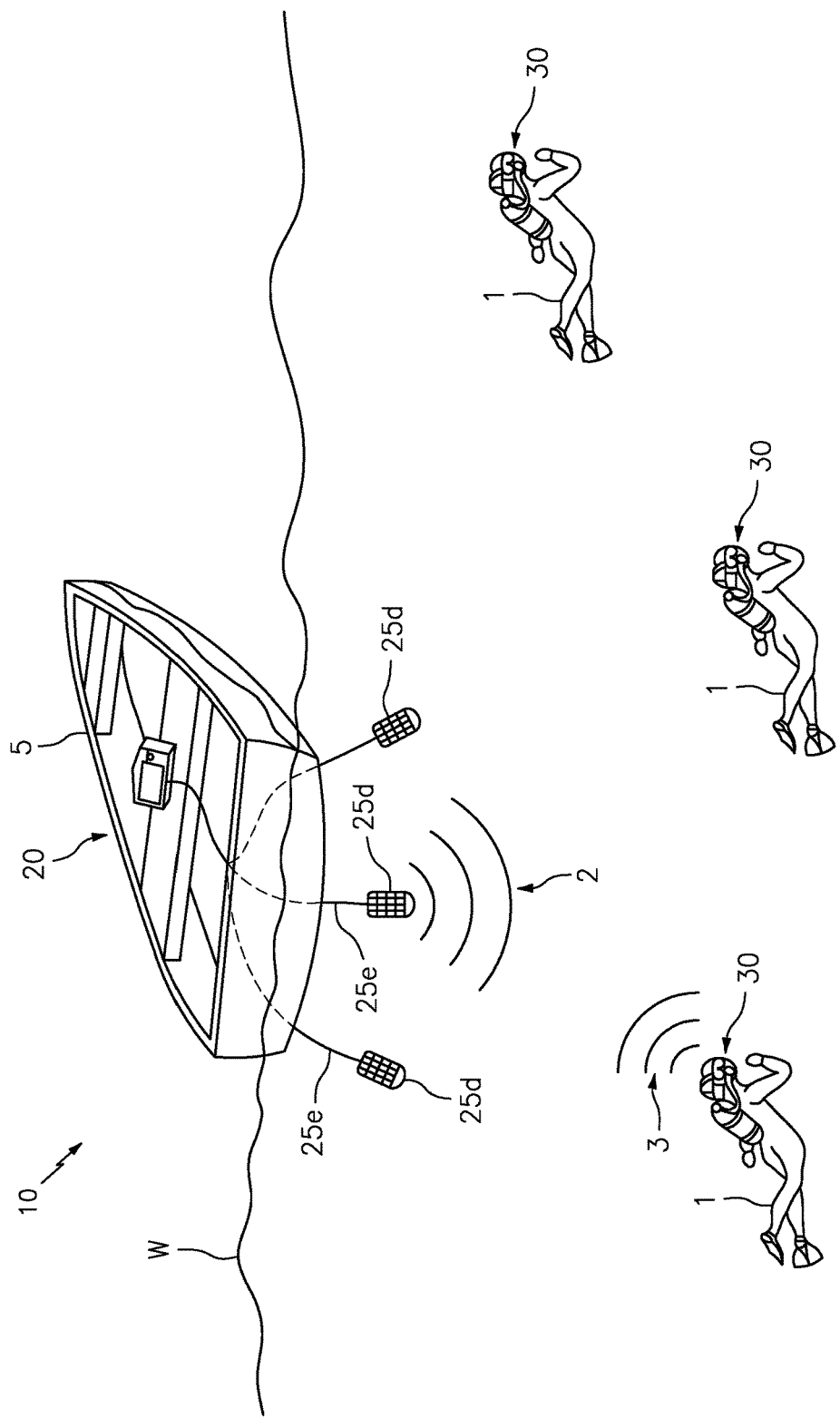
FIG. 5 is a perspective view of the underwater positioning system in operation, in accordance with one embodiment of the invention.

Upon receiving a command from the CPU 21, the transmitter 25a can emit a signal, such as sound waves 2 through the water W for detection by the diver unit 30 (See FIG. 5). Likewise, the receiver 25c can receive an emergency distress signal, such as sound waves 3, for example; that can be transmitted through the water W from the diver unit 30.

In the preferred embodiment, the transmitted signals 2 and/or 3 can include a specific identifier which can be identified by the diver unit 30 and the base station 20, respectively. In this regard, the sound waves 2 and 3 can include any number of unique and/or distinctive elements such as a distinct or specific frequency, modulation, amplitude and/or signal, for example, that can allow the signal filter within the respective communication unit to recognize the transmitted signal, and to distinguish the same from other underwater noise and/or different underwater location systems which may be in use nearby. Such signals can be stored within the device memory 23, and implemented by the processor 22 to the transmitter 25a, for example.

The user interface 26 can include any form of input/output device having any number of different components that can function to accept user inputs and/or to provide operating information to a device user. In various embodiments, the user interface can include or control any number of different buttons/switches 26a that are connected to the processor 22 so as to activate various programmatic functions. The user interface can also include or control any number of lights 26b so as to provide information to the user, such as whether the device is in the ON or OFF operating state, for example.

Moreover, the user interface can include or control any number of user displays, such as a touch screen Graphic User Interface (GUI) 26c, for example that is capable of performing two way communications with a device user. Likewise, the user interface can also include or control any number of communication ports 26d, such as the illustrated micro USB ports, for example, in order to send and receive information with another device via a direct communication link.

In this regard, the communication ports 26d can be communicatively linked to the diver unit via a communication cable 26d1, in order to pair a particular diver unit 30 with the base station 20. As described herein, the term "pairing" can include providing the diver unit with the specific identifier so as to allow the diver unit to receive and/or send transmitted signals with a respective base station, as described above. Although described as utilizing a physical cable to pair the devices, other embodiments are contemplated wherein the base station can be paired with each of the diver units in a wireless manner. One such example can include a Bluetooth transceiver located in each of the diver units and the base station.

In various embodiments, the user interface can also include an emergency diver locator 28. The emergency locator can be incorporated into the above described GUI, and/or can include essentially identical features and functionality to the below described diver display 40.

In one preferred embodiment, the base station 20 can be powered 27 via the onboard power supply of the vessel in which the base station is located. As such, the base station can include any necessary components such as one or more AC and/or DC power cords, for example. Of course, the base station 20 can also include one or more batteries that are capable of providing the necessary power requirements to each element when outside power is not available.

Figure 3A:
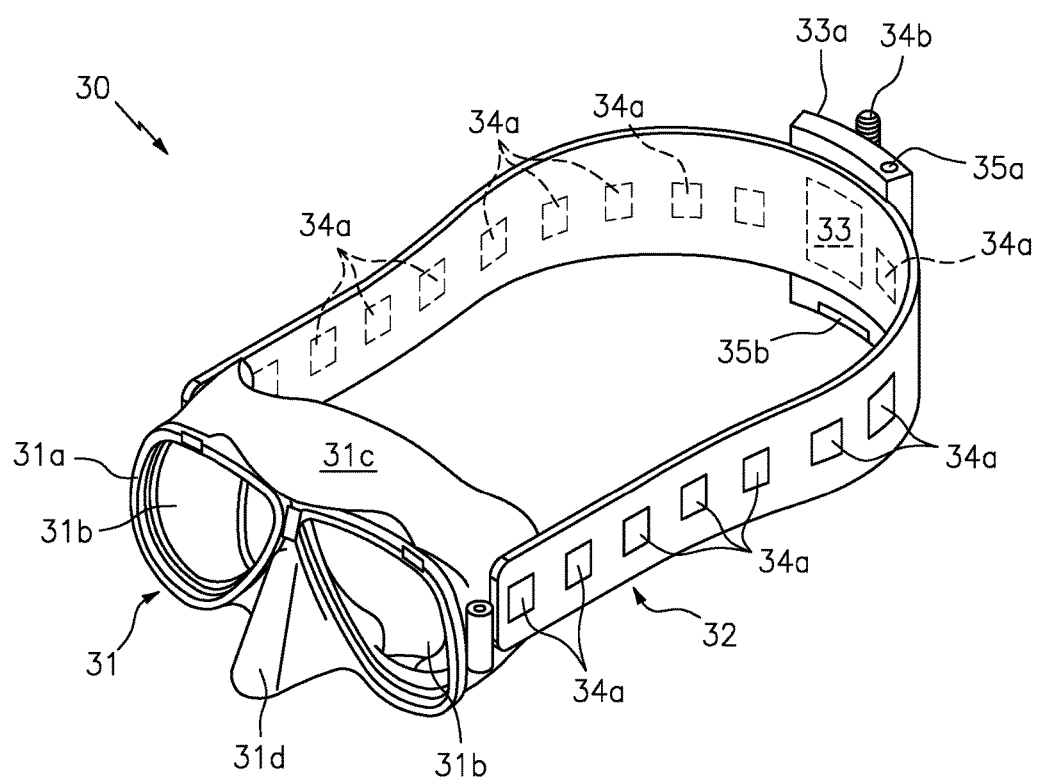
FIG. 3A is a perspective view of the diver unit, in accordance with one embodiment of the invention.
Figure 3B:
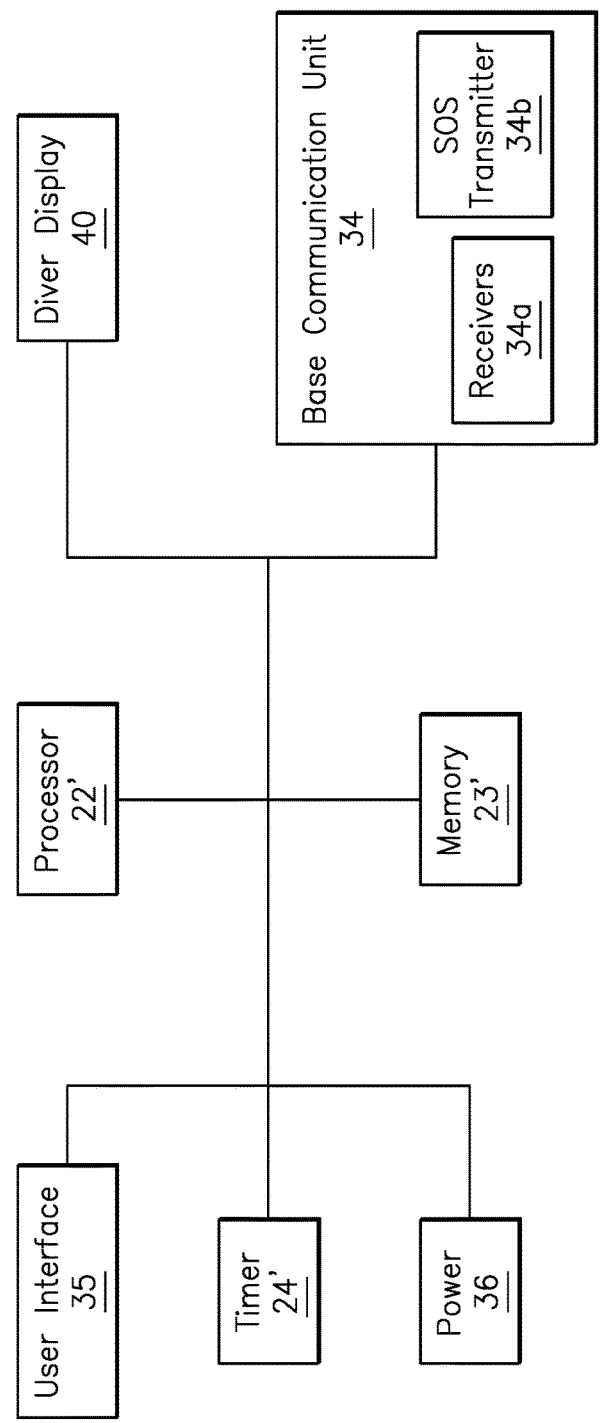
FIG. 3B is a simplified block diagram of the diver unit, in accordance with one embodiment of the invention.
Figure 4:
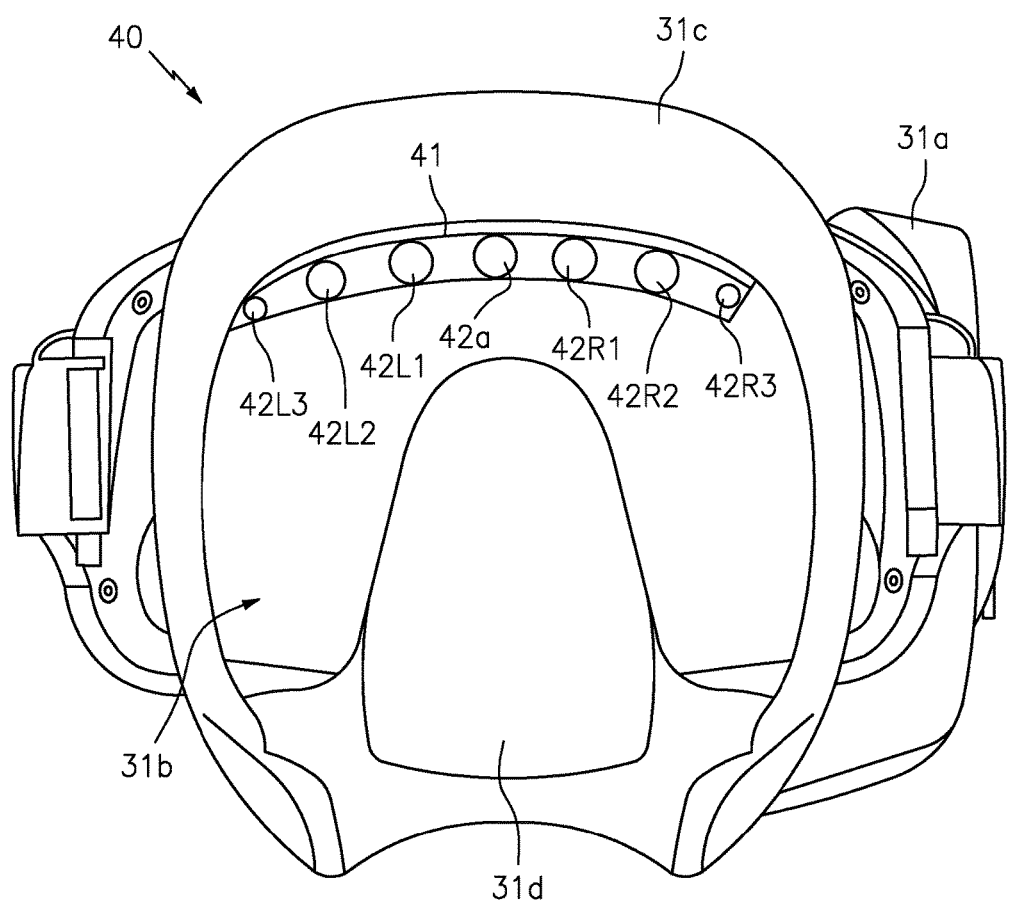
FIG. 4 is a back side view of the diver unit, in accordance with one embodiment of the invention.

FIGS. 3A, 3B and 4 illustrate one embodiment of the diver unit 30. As shown, the diver unit can include a diver control unit 33, a diver display 40, and a diver attachment device such as the illustrated underwater mask 31 and head strap 32.

In the illustrated embodiment, the underwater mask 31 can include a scuba-style mask having a frame 31a, one or more lenses 31b, a face skirt 31c and/or a nose pocket 31d, that are connected to the head strap 32 in accordance with known methodologies. Of course, the diver attachment unit is not limited to the illustrated mask and strap, as any type of device that can be worn on or secured to a user in an underwater environment is also contemplated. Several non-limiting examples include wristwatch-style displays, underwater tablets, dive computers, and other such instruments which can be used with or integrated into dive equipment.

As shown best in FIG. 3B, the diver control unit 33 can include a main body 33a having a processor 22' that is conventionally connected to an internal memory 23', a timer module 24', a base communication unit 34, a user interface 35, an onboard power source 36 and/or a diver display 40.

The main body 33a of the diver control unit can preferably be constructed from a lightweight fully waterproof material that is suitable for storing the device components when operating in underwater environments of 100 feet or more. Owing to the fact that the control unit is designed to be worn on or about the head of a user, it is preferred that the unit 33 be as small and lightweight as possible. In this regard, the main body can include any number of different shapes and sizes, and can include any number of connectors for securing the body 33a onto or within any portion of the mask 31 and/or strap 32. In various embodiments, the unit 33 can be included into the new construction of the mask or strap, so as to form an integral component of the same at a time of manufacture.

The processor 22', memory 23' and timer module 24' can include substantially identical elements to the above described processor 22, memory 23 and timer module 24. The power source 36 can include one or more lightweight batteries capable of providing the necessary power requirements to each element of the diver unit 30. In one preferred embodiment, the batteries can be permanently located within the main body 33a and can be rechargeable in nature via the communication and charging port 35b, for example. Of course, traditional batteries can also be utilized and the main body can further include a watertight battery compartment having a removable cover (not illustrated) for allowing a user to access the same. Moreover, in one embodiment, the diver unit can include the necessary components to allow the internal batteries to be charged via an induction charger, for example.

The base communication unit 34 can include any number of different components that are capable of sending and/or receiving any type of signal, in order to communicate wirelessly with an external device, such as the above described base station 20. In the preferred embodiment, the communication unit 34 can include a portable sonar system having a plurality of receiver sensors 34a that are disposed along the mask 31 and/or strap 32. As shown, the sensors are preferably arranged in a circular formation about the circumference of the mask and strap, so as to receive signals from any direction when worn by an underwater diver. The communication unit 34 can also include an SOS transducer and transmitter 34b.

Each of the receiver sensors 34a can function to detect and receive the sound waves 2 transmitted by the base station 20 containing the above described specific identifier. Upon receiving the signal from one or more of the sensors, the processor and memory can perform a signal direction triangulation. The triangulation can be performed, for example, by comparing the strength of the received signal at each receiver, for example. In either instance, once the direction has been triangulated, the processor can activate the diver display 40 to show the diver where the signal is coming from.

In an emergency situation, the communication unit 34 can also function to transmit an SOS signal, such as a sound wave for example, having a specific emergency identifier. This emergency signal can be received by the base station 20 and any other diver units 30, wherein the diver display 40 of each mask, and the emergency diver locator 28 of the base station 20 can be used to allow others to find the diver in distress. The SOS feature can be activated by the diver via a button 33a or other such device.

In various embodiments, the diver unit 30 can also include functionality for automatically transmitting an SOS signal 3. For example, the timer module 24' can notify the processor 22' that a predetermined amount of time, (such as 3 minutes, for example) has passed. If, during such time the receiver sensors 34a have not detected a change in the triangulation of the base station signal 2, the processor can activate the transmitter 34b. Such a feature also being advantageous for allowing someone to locate and retrieve a lost mask, for example. Of course, other means for identifying an emergency situation and activating the SOS feature are also contemplated.

The user interface 35 can include any form of input/output device having number of different components that can function to accept user inputs and/or to provide operating information to a device user. In various embodiments, the user interface can include or control any number of different buttons/switches 35a, that are connected to the processor 22' so as to activate various programmatic functions. The user interface can also include a wireless transceiver and/or one or more communication ports 35b, which can function to pair the diver unit with the base station 20, as described above.

The diver display 40 can include any number of different components that are capable of functioning to provide a visual indication of the location of the base station 20 and/or an SOS signal to a diver 1 wearing the diver unit 30. As shown in FIG. 4, one embodiment of the diver display 40 can include a light strip 41 having a plurality of light emitting diodes (LED) disposed thereon. The display can be located along an inside facing portion of the mask 31, so as to be visible to a diver at all times. In this regard, the light strip can be adhered to the mask utilizing any type of adhesive material and/or can be integrated with the construction of the mask so as to form an integral component thereof.

In the illustrated embodiment, the display 40 can function to selectively illuminate the LED's based on the orientation of the diver unit 30 to the transmitter of the base station 20. For example, when the diver is heading directly towards the base station, the center light 42a can be illuminated. Alternatively, when the base station is on the left side of the diver, lights 42L1, 42L2 and 42L3 can be selectively illuminated, based on how far to the left (or behind the diver) the base station is. Likewise, when the base station is on the right side of the diver, lights 42R1, 42R2 and 42R3 can be selectively illuminated, based on how far to the right (or behind the diver) the base station is.

In either instance, each of the lights can be configured to produce any number of different colors in varying brightness. Also, the lights can be configured to flash or produce various patterns to notify the diver wearing the diver unit. For example, when the diver unit is receiving the signal 2 from the base station, the lights can be selectively activated to display a green indication, whereas when an SOS signal is detected the lights can be selectively illuminated in red. In various embodiments, the base station can send a return signal to each of the dive units to indicate that the dive time is over. Such a signal can result in the lights flashing, for example. Of course, any number of other signals and meanings can be performed.

FIG. 5 illustrates one embodiment of the system 10 in operation. As shown, the base station 20 can be located at the divers Point of Entry (POE), such as a dive boat 5, for example. Upon pairing each of the diver units 30 with the base station 20, as described above, the base station transmitter and receiver in the housing 25d can be suspended below the water W via the cable 25e, and the divers 1 can enter the water. During the dive, the transmitter can emit the sound waves 2 through the water which can be detected by each of the dive units providing the same with the location of the POE at all times. In the event that a diver experiences an emergency situation, the affected diver can transmit an SOS signal 3 to the base station and other nearby divers for assistance.

As described herein, one or more elements of the base station 20 and/or the diver unit 30 can each be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An underwater positioning system, comprising:
   a base station that includes
      a main body,
      a user interface that functions to send and receive operating instructions with a device user, and
      a diver communication unit that includes a transmitter and a receiver, said unit further including functionality for transmitting and receiving underwater signals having a specific identifier; and
   at least one diver unit, each of the at least one diver unit including
      an underwater mask and head strap,
      a plurality of receiver sensors that are fixedly positioned 360 degrees along a circumference of the mask and the head strap, said sensors being configured to only receive the transmitted underwater signals having the specific identifier, and an emergency SOS signal from any direction,
      a diver control unit that is secured along one of the underwater mask and head strap, said diver control unit being configured to receive information from the receiver sensors and to triangulate a location of the base station or a location of the emergency SOS signal, and
      a diver display that provides a visual indication of a direction of the base station or the emergency SOS signal, based on the triangulation,
      said diver display comprising a light strip having a plurality of lighted elements that are arranged serially along an inside facing portion of the mask, said lighted elements being selectively illuminated between a left side and a right side to indicate the location of the base station or the location of the SOS emergency signal relative to a location of the diver unit.

2. The system of claim 1, further comprising:
   a waterproof housing that is in communication with the main body of the base station via an elongated cable, said waterproof housing including the diver communication unit transmitter and receiver therein.

3. The system of claim 1, wherein the specific identifier includes a specific frequency modulation.

4. The system of claim 1, wherein the diver communication unit includes a portable sonar unit, and the underwater signals include sound waves.

5. The system of claim 1, further comprising:
   at least one communication port that is disposed along the base station; and
   a complementary communication port that is disposed along each of the at least one diver units, wherein the communication port and the at least one complementary communication port are configured to receive a communication cable for pairing the diver unit with the base station.

6. The system of claim 1, further comprising:
a transmitter that is positioned within the diver unit, said transmitter being configured to transmit the emergency SOS signal.

7. The system of claim 6, wherein the receiver of the base station includes functionality for receiving the emergency SOS signal.

8. The system of claim 6, wherein the at least one diver unit comprises:
a plurality of diver units,
each of the plurality of diver units are configured to receive each of the transmitted underwater signal and the emergency SOS signal, and
each of the plurality of diver units are configured to triangulate a position of the transmitted SOS signal.

9. The system of claim 6, further comprising:
a button for selectively activating the transmitter to send the emergency SOS signal.

10. The system of claim 6, wherein the diver unit includes functionality for automatically transmitting the emergency SOS signal upon the occurrence of a specified event.

11. The system of claim 10, wherein the specified event includes an expiration of a predetermined period of time without an updated triangulation of the location of the base station.

\* \* \* \* \*